(12) United States Patent
Razzaghe-Ashrafi

(10) Patent No.: US 6,330,715 B1
(45) Date of Patent: *Dec. 11, 2001

(54) METHOD AND APPARATUS FOR MANAGING SOFTWARE IN A NETWORK SYSTEM

(75) Inventor: Siamak Razzaghe-Ashrafi, Santa Clara, CA (US)

(73) Assignee: Nortel Networks Limited (CA)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/081,135

(22) Filed: May 19, 1998

(51) Int. Cl.[7] ................................................. G06F 9/445
(52) U.S. Cl. .......................... 717/11; 714/4; 714/38; 709/305; 709/221
(58) Field of Search ........................... 395/712; 717/11; 714/4, 38; 709/305, 221

(56) References Cited

U.S. PATENT DOCUMENTS

| | | | |
|---|---|---|---|
| 4,558,413 | * | 12/1985 | Schmidt et al. ...................... 707/203 |
| 4,954,941 | * | 9/1990 | Redman ................................ 395/712 |
| 5,008,814 | * | 4/1991 | Mathur ............................ 395/200.51 |
| 5,155,847 | * | 10/1992 | Kirouac et al. ................. 395/200.51 |
| 5,555,418 | * | 9/1996 | Nilsson et al. ....................... 709/305 |
| 5,586,304 | * | 12/1996 | Stupek, Jr. et al. ................. 395/712 |
| 5,682,533 | * | 10/1997 | Siljestroemer ...................... 707/200 |
| 5,732,275 | * | 3/1998 | Kullick et al. .......................... 717/11 |
| 5,745,675 | * | 4/1998 | Herbig et al. .......................... 714/38 |
| 5,752,042 | * | 5/1998 | Cole et al. ........................... 395/712 |
| 5,781,716 | * | 7/1998 | Hemphill et al. ........................ 714/4 |
| 5,805,891 | * | 9/1998 | Bizunch et al. ....................... 395/704 |
| 5,892,916 | * | 3/1999 | Gehlhaar et al. ..................... 709/223 |
| 5,909,581 | * | 6/1999 | Park ....................................... 717/11 |
| 5,930,513 | * | 7/1999 | Taylor .................................... 717/11 |
| 6,035,339 | * | 3/2000 | Agraharam et al. ................. 709/246 |
| 6,070,012 | * | 5/2000 | Eitner et al. ........................... 717/11 |
| 6,212,557 | * | 4/2001 | Oran .................................... 709/221 |

OTHER PUBLICATIONS

Insider software: Insider Update Agent sets new standard for update downloading power. Publication: M2 Communications. Source M2 Pressire, Nov. 13, 1998.*

* cited by examiner

Primary Examiner—Mark R. Powell
Assistant Examiner—Chameli C. Das
(74) Attorney, Agent, or Firm—Finnegan, Henderson, Farabow, Garrett & Dunner, L.L.P.

(57) ABSTRACT

A method and system for verifying and updating a software subsystem stored on a network system (NS) device is provided. A technique is provided, which verifies and corrects an altered or corrupt software subsystem in flash memory. The verification technique checks to verify that the software subsystem has not been altered since the software subsystem was originally stored on the network system (NS) device. If it has been altered, a software system generator regenerates the software system. Another technique is provided which ensures that the software subsystem in the NS device is updated properly. The latest versions of the software subsystem and corresponding software system generator are stored on a server coupled to the NS device over a network. The updated software system generator stored on the server is downloaded onto the NS device. The software subsystem is updated by invoking the updated software system generator. The software system generator generates an updated software subsystem, which replaces the software subsystem on the NS device.

27 Claims, 6 Drawing Sheets

METHOD AND APPARATUS FOR MANAGING SOFTWARE IN A NETWORK SYSTEM

BACKGROUND OF THE INVENTION

1. Field of the Invention

This invention generally relates to network systems and more particularly, to a method and apparatus for managing software in a network system.

2. Description of the Related Art

An increasing reliance on computers has made them a necessity in the modem world. Computers and embedded systems are used in a wide range of environments from office desktops to manufacturing shop floors. Over the years, computer companies have competed over price and performance to fulfill the needs of computers in these marketplaces. Recently, there has also been a race to increase performance while reducing the "total cost of ownership". Total cost of ownership is a term used to describe both the cost of purchasing the computer system as well as the cost of maintaining the system over its useful life.

Reducing the total cost of ownership, however, is typically not compromised with performance and features. High performance computer systems that are easy to use and inexpensive to maintain has become the mantra in the computer industry. Consequently, new computer systems, telephone switches, and other computer assisted devices must offer a lower purchase price, a lower cost of maintenance, and an increasing number of features.

Network system (NS) devices have reduced the total cost of ownership significantly by off-loading complex configuration information and software to a central server. NS devices are generally coupled to a larger computer server over a network to provide software configuration information, software updates, and processing capabilities. As a consequence, NS devices, such as Network Computers (NC) and Personal Digital Assistants (PDA), do not require large amounts of local disk drive storage and memory. Instead, NS devices are coupled to the central server over high speed networks, which deliver the latest software updates and configuration information on demand. This reduces maintenance costs because software updates are applied to a central server rather than each individual NS device.

NS devices are also less expensive to administer because users can't easily modify configuration information. Generally, critical configuration information is kept on the server where only the administrator can make changes. This prevents users from accidentally making configuration changes that could impact individual computer system performance or bring down an entire network. This aspect of NS devices protects the users as well as the integrity of the overall system.

To accommodate these various requirements, NS devices generally store a small operating system or core routines in fast access flash memory. Flash memory has lower maintenance costs than typical disk drives because it has no moving parts and a much lower likelihood of system failure. The operating system stored in flash memory can boot the NS device, connect the NS device to a network, download code from a server as needed, and provide a user interface to the various services provided on the server systems. For example, a "bootp" protocol stored in flash memory boots the device and connects the device to the network. A "tftp" (trivial file transfer protocol) service burned into flash memory enables the NS device to download files from the network to access the latest software applications. More sophisticated operating systems may include more advanced protocols to boot a device and download data.

A "burning" process is used to store the operating system instructions into flash memory. These instructions stored in flash memory are maintained even when the device is turned off. Flash memory, also known as flash erasable programmable read only memory, (FEPROM) is a type of nonvolatile storage similar to electrical erasable programmable read only memory (EEPROM). Flash memory is advantageous compared to EEPROMs because flash can be reprogrammed with the flash chip installed in the NS device. Consequently, an NS device with flash memory can typically be upgraded in the field without upgrading or swapping out hardware on the NS device.

Conventional NS devices, however, generally upgrade the software in flash memory as a single unit or in large blocks of flash memory. These upgrades, which are typically performed over a network, can overwrite crucial portions of the operating system that allow the device to boot and download files. If a network failure or system failure occurs part way through an update and corrupts the boot routine in the operating system, the NS device could be left inoperable. This could impact distributed telephone switches that distribute call processing tasks to NS devices having flash memory. For example, severe telephone outages could occur if the NS devices on a distributed telephone switching system were not upgraded properly.

Managing software in the flash memory of an NS device is also difficult because of protocol changes and version changes that might occur on the server machines. Typically, basic operating system routines burned in flash rely on certain protocols and versions of software existing on a server machine. For example, a conventional operating system for an NS device generally can only use the "bootp" protocol and the "tftp" protocol if they are compatible with the corresponding software versions and protocols on a server machine. The NS device will not boot if the "bootp" protocol on the server is upgraded to a new version of software that is incompatible with the NS device. Applications like "tftp" will also not work on the NS device if they are out of date compared to the software on the server.

Ideally, NS devices should be robust enough to continue operating even if several errors or subsystem failures occur. Currently, however, NS devices and the corresponding subsystems are not designed this way. A failure in an important subsystem within an existing NS device can cause overall system failure or severe performance degradation. This can require expensive and extensive repairs or upgrades before the NS device can resume operating. For example, it may be necessary to actually replace a flash memory device within a NS device if the executable image in flash memory is corrupted or contains an incompatible version. Diagnosing and solving these type of problems can require several hours of analysis and may be very expensive.

Accordingly, it is desirable to improve software management on NS devices.

SUMMARY OF THE INVENTION

A method and system for verifying a software subsystem stored on a network system (NS) device is provided. Typically, the NS device is coupled to a server computer over a network. Initially, the method and system initiates a load of the software subsystem from a storage device associated with the NS device. A check is made to verify that the software subsystem has not been altered since the software subsystem was originally stored on the NS device. When it is discovered that the software subsystem has been altered, the software subsystem is regenerated using a software subsystem generator.

In another aspect of the present invention, a method and system is provided for updating the software subsystem on the NS device. The latest version of the software subsystem can be stored on a server coupled to the NS device over a network. Initially, the method and system determines if the software subsystem generator on the NS device is the most recent version. When the software subsystem generator on the NS device is not the most recent version, the software subsystem generator stored on the NS device is updated with the more recent version of the software subsystem generator stored on the server. The method and system determines if the software subsystem loaded on the NS device is the most recent version of the software subsystem compared with the software subsystem version the updated software subsystem generator is capable of generating. When the software subsystem on the NS device is not the most recent version, the software subsystem is updated by invoking the updated software subsystem generator. The software subsystem generator generates an updated software subsystem which replaces the software subsystem on the NS device. The software subsystem generator may also install a new communication protocol useful in downloading subsequent software subsystem generators stored on the server.

BRIEF DESCRIPTION OF THE DRAWINGS

The accompanying drawings, which are incorporated in and constitute a part of this specification, illustrate an embodiment of the invention and, together with the description, serve to explain the advantages and principles of the invention.

In the drawings.

DETAILED DESCRIPTION OF THE INVENTION

Introduction

Reference will now be made in detail to an implementation of the present invention as illustrated in the accompanying drawings. Wherever possible, the same reference numbers will be used throughout the drawings and the following description to refer to the same or like parts.

Systems consistent with the present invention address shortcomings of the prior art and provide a unique method of managing the updates to software subsystems stored on a NS device. This software subsystem management technique is particularly useful in flash memory-based systems, which fail if an update in flash is interrupted.

In methods and systems consistent with the present invention, the software subsystem manager loads two different images into flash memory: the software subsystem and a software subsystem generator, which can boot and then generate the software subsystem. Unlike conventional systems, the flash memory system will always be able to execute even if the software subsystem, such as an operating system, has been corrupted or contains an incompatible version of software. This capability is particularly advantageous on systems that require high reliability, easy upgrade paths, and easy maintenance. Many phone systems and private branch exchanges (PBX) have these requirements.

Distributed Computing Network

Figure 1:
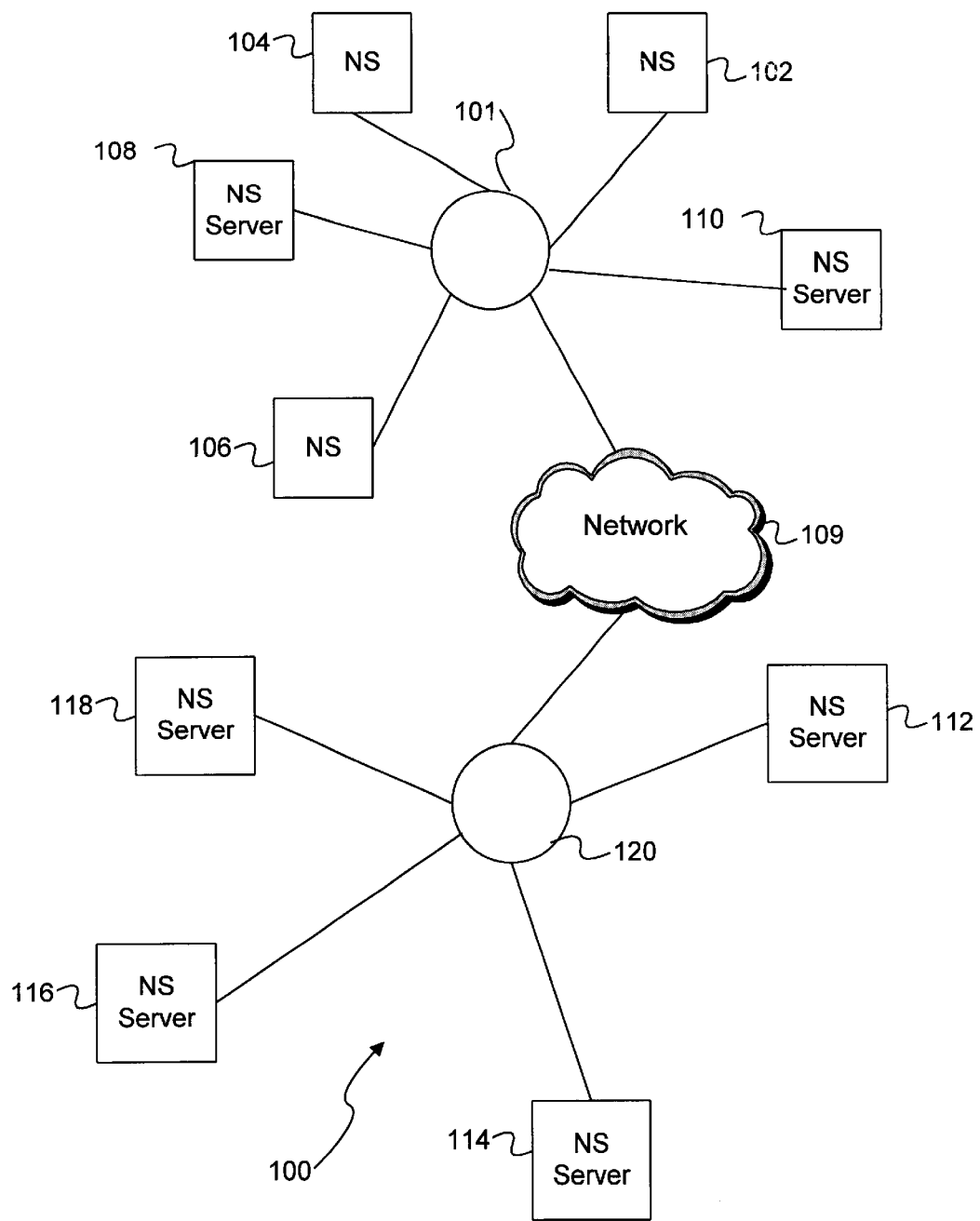
FIG. 1 illustrates a network suitable for use with methods and systems consistent with the present invention.

FIG. 1 illustrates a network suitable for use with methods and systems consistent with the present invention. Computer network 100 in FIG. 1 includes a local area network 101, a wide area network (WAN) 109, and another local area network (LAN) 120. In FIG. 1, local area network 101 includes NS devices 102, 104 and 106 and NS servers 108 and 110. Local area network 120 includes NS servers 112, 114, 116, and 118. This exemplary configuration of network computers and network computer servers illustrates the connectivity between the NS devices and NS servers.

NS devices 102, 104 and 106 implement a novel technique for updating new versions of software and repairing corrupt versions of software on a data storage device in accordance with the present invention. For purposes of this discussion, various embodiments of the present invention are referred to collectively as the NS software manager. Implementations consistent with the present invention can be developed to manage software stored on many different types of storage devices including flash memory, DRAM, hard disks, and read-writable CD-ROMs.

Flash memory is often used on NS devices because of its ability to store data while a system is off and its overall high performance. Flash memory is also used in lieu of disk drive storage devices because it is solid state and has a higher mean time between failure than normal electromechanical devices such as a disk drive. This lowers the total cost of ownership and potentially makes products using flash memory and the NS software manager more competitive in the marketplace.

The NS software manager is particularly useful in updating software and repairing corrupted software stored in flash memory. Referring to FIG. 1, the NS software manager can be used to update NS devices 102, 104, and 106 using any of NS servers 108, 110, 112, 114, 116 and 118. NS software manager coordinates transporting a software subsystem, such as an operating system or a boot record, stored on an NS server. These file server capabilities can be stored in slower DRAM memory such as memory 207 or stored in faster flash memory such as flash memory 204 as indicated by the connection between remote file server client 206 and an OS extension 218 stored in flash memory 204.

Figure 2:
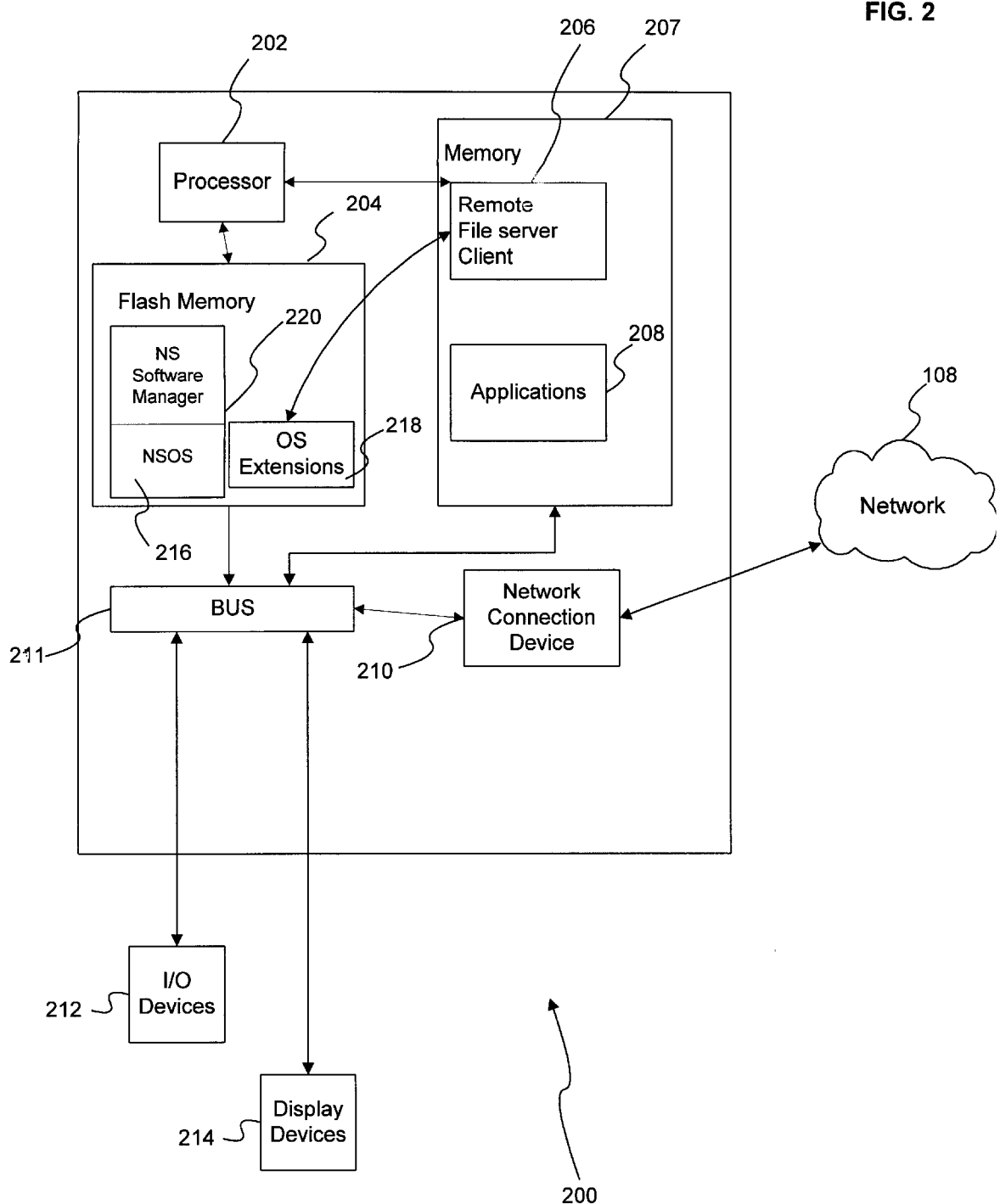
FIG. 2 is a block diagram of a NS device suitable for use with methods and systems consistent with the present invention.

Referring to FIG. 2, a block diagram illustrates a network system (NS) device suitable for use with methods and systems consistent with the present invention. This particular NS device is capable of booting from flash memory. NS device 200 includes a processor 202, a flash memory 204, a memory 207 (DRAM), a network connection device 210 coupled to network 108, and a bus 211 coupled to I/O devices 212 and display devices 214. Bus 211 is also coupled to flash memory 204 and memory 207. Essentially, bus 211 facilitates communication of control and data signals among the various subsystems included in NS device 200.

Processor 202 processes instructions burned into flash memory 204 as well as instructions stored in memory 207. Processor 202 can be a general purpose computing device or an embedded processor based on different processor architectures. Nominally, memory 207 includes a remote file server client 206 and various applications 208. Remote file server client 206 provides file server capabilities over a network 108, which is coupled through network connection device 210. These file server capabilities allow NS device 200 to update software subsystems by downloading files from an NS server. These file server capabilities can be stored in slower DRAM memory such as memory 207 or stored in faster flash memory such as flash memory 204 as indicated by the connection between remote file server client 206 and an OS extension 218 stored in flash memory 204.

Remote file server client 206 can be implemented based upon the network file system services (NFS). NFS is a stateless file sharing service, which enables the client to access a remote file system as though the data were stored on a local drive. Alternatively, the Andrew File System (AFS), could also be used to implement remote file server client 206.

Also, remote fileserver client 206 can be implemented using a more primitive set of services such as bootp tftp or ftp (file transfer protocol) to gain access to remote filesystems. Bootp is service that enables an NS device to register itself with an NS server. On a TCP/IP based network bootp registers NS device 200 by broadcasting a unique media access control (MAC) address associated with network connection device 210. An NS server on the network listening for bootp broadcasts and assigns an IP (internet protocol) address to the MAC based upon information contained within an internal configuration file. The server also adds this information to an ARP (address resolution protocol) cache for later use in resolving the IP and MAC addresses. Essentially, the NS server provides NS device 200 with an IP address. NS device 200 uses various IP addresses in conjunction with tftp or ftp to access updated and non-corrupted software subsystems stored on the NS server.

In an alternative embodiment, a Dynamic Host Configuration Protocol (DHCP) obviates the need for an internal configuration file by dynamically allocating an IP addresses when a NS device makes a DHCP request. DHCP provides a mechanism for dynamic assignment of IP addresses to hosts, delivery of addresses to hosts through an IP network and delivery of other configuration parameters such as subnet masks and default router addresses. The DHCP Internet Draft Standard is described in Request for Comments (RFC) 2131 located on the World-Wide-Web (WWW) at http://ds.internic.net/rfc/rfc2132.txt and options in the 'options' field of DHCP are listed in RFC 2132 located at http://ds.internic.net/rfc/rfc2132.txt on the WWW. Other RFCs and Internet documents are available from the InterNIC documentation server at http://ds.internic.net/ds/dspg0intdoc.html.. The Dynamic Host Configuration Working Group (DHC WG) of the Internet Engineering Task Force (IETF) at http://www.ietf.cnri.reston.va.us/home.html is developing DHCP.

Software subsystems that are accessed frequently by processor 202 are normally burned into flash memory 204. These applications can include an NS software manager 220 consistent with the present invention, a network system operating system (NSOS) 216, and operating system (OS) extensions 218.

NSOS 216 facilitates local computing operations that NS device 200 must perform such as file operations, error handling routines, memory management routines, and other functions essential to the operation of NS device 200. In one embodiment, NSOS 216 is the vxWorks real-time operating system, which is often used in telephone switching equipment and other devices which require real-time response and low latency. Further, OS extensions 218 may include OS extensions useful in a distributed network computing environment. For example, OS extensions 218 may include bootp, tftp, ftp, NFS, AFS, telenet (telnet), and other extensions used in the particular distributed computing environment.

Those skilled in the art will appreciate that operating systems are just one type of software subsystem that the NS software manager 200 can manage. Accordingly, alternative embodiments could be implemented to manage other types of applications other than the operating system mentioned above.

As illustrated, bus 211 provides a connection point for I/O devices 212, display devices 214, and network connection device 210. Bus 211 can include standard interface protocols such as PCI, PCMCIA, ISA, EISA, SCSI, ESDI, or any other protocol used to couple peripheral devices to a computing system. I/O devices 212 can include keyboard, mouse, and other pointing devices or input devices suitable to the particular computing system. Similarly, display devices 214 can be a wide range of display devices including an oversized cathode ray tube (CRT) or a compact liquid crystal display (LCD) tailored to the particular application for use with NS device 200. Network connection device 210 can be an ethernet type adapter or any device compatible with a TCP/IP network.

Figure 3:
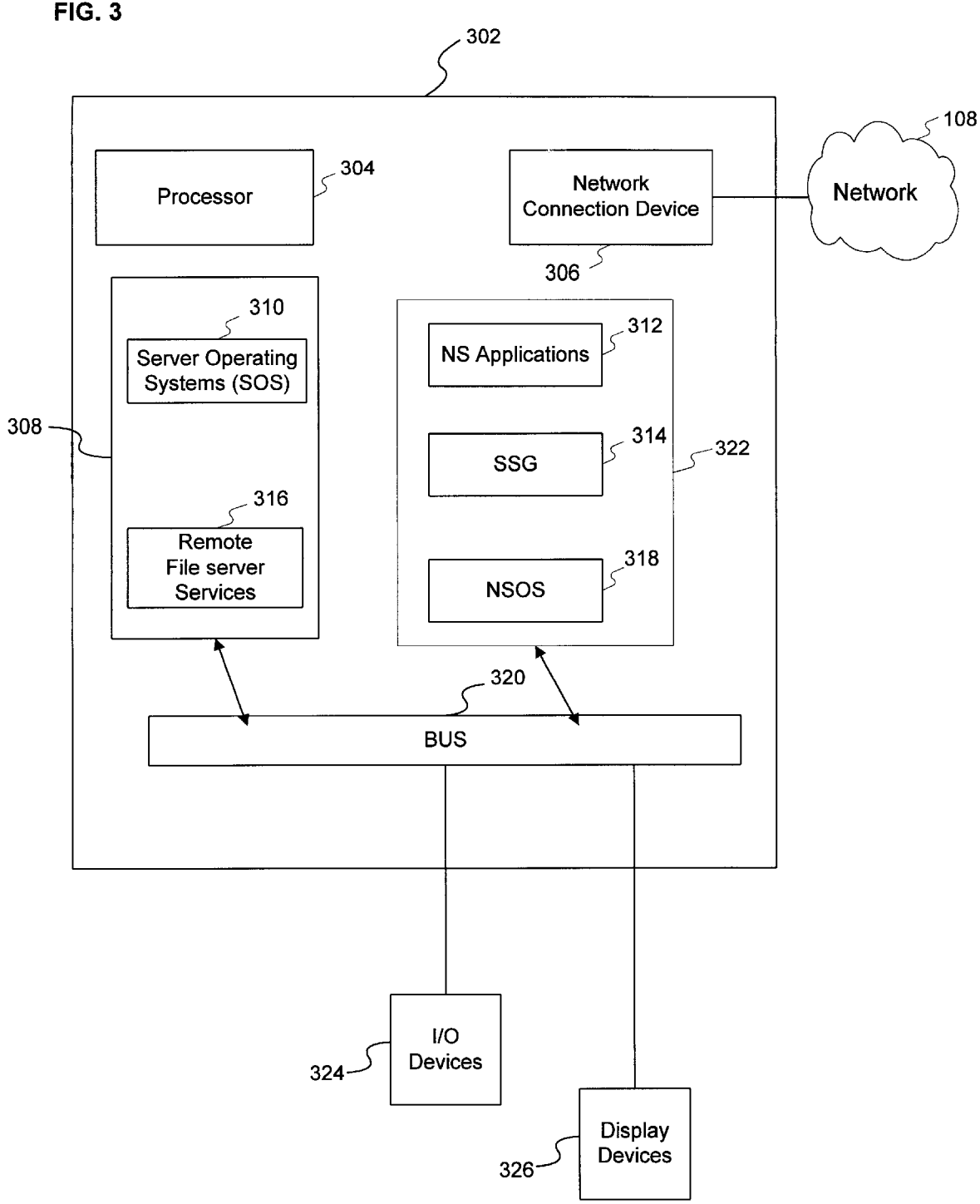
FIG. 3 is a block diagram of a NS server suitable for use with methods and systems consistent with the present invention.

FIG. 3 is a block diagram of a NS server suitable for use with methods and systems consistent with the present invention. NS server 302 includes a processor 304, a network connection device 306, a memory 308, a bus 320 coupled to a secondary storage device 322, an I/O devices 324, and a display devices 326. Processor 304 may be implemented utilizing any number of processor architectures and can use the same architectures as processor 202 in FIG. 2.

Network connection device 306 is coupled to (NFS) services and facilitates communication between NS server 302 and NS device 200 illustrated in FIG. 2.

A network protocol compatible with network connection device 306 such as TCP/IP, provides a common protocol for sharing information and communicating to each NS device 200.

Memory 308 includes a server operating system (SOS) 310 as well as remote file server services, which correspond to similar services in OS extensions 218 used by NS device 200 in FIG. 2. Accordingly, SOS 310 can be the vxWorks operating system or any other operating system that interoperates with the network system operating system (NSOS) loaded on NS device 200. Remote file server services 316 provide the server side of various distributed computing services including NFS, AFS, ftp, tftp, bootp, and any other extensions useful in implementing a distributed network system.

Various software subsystems used on NS device 200 are stored in a secondary storage 322. The system administrator or manager places the latest versions of the software subsystems in secondary storage 322. NS software manager 220 ensures that these software subsystems are loaded into flash memory of NS device 200. Secondary storage can be a removable CD-ROM media that contains various software subsystems used by NS devices 200. Each software subsystem stored on CD-ROM includes executable code and software routines including NS software manager 220 of the present invention. CD-ROM provides a simple technique for loading NS software manager 220 and other software subsystems onto NS server 302. Additionally, one skilled in the art will appreciate that various embodiments of the present invention can also be stored on or read from other types of computer-readable media, such as secondary storage devices, like hard disks, or floppy disks, a carrier wave from the Internet, or other forms of RAM or ROM.

Typical software subsystems stored on secondary storage 322 include NS applications 312, software subsystem generator (SSG) 314, and network system operating system (NSOS) 318. NS applications 312 can include any number of applications used by the NS device 200.

SSG 314 is a novel type of software subsystem designed in accordance with the present invention. Specifically, SSG 314 is a meta-software application used to regenerate a particular software subsystem. For example, SSG 314 can be used to generate a particular version of a software subsystem such as a small operating system, a boot module, or a small runtime module associated with NS device 200. Generally, SSG 314 is used on NS device 200 to regenerate damaged or out-of-date software subsystems.

NSOS 318 includes the latest version of the NS device operating system or runtime environment. NSOS 318 can be useful if one plans to install a new NSOS image directly on the NS device 200 and not use SSG 314 to create NSOS 318 dynamically.

NS device 200, which connects to NS server 302, implements the NS software manager and enables NS devices to take advantage of recent updates. Accordingly, it is important that bus 320 provides a high speed communication link to secondary storage device 322. High transfer rates over bus 320 between secondary storage device 322 and network 108 ensures that client systems coupled to NS server 302 will receive data quickly and efficiently.

NS server 302 includes I/O devices 324 and display devices 326 to monitor and control operation of the system. Typically, I/O devices 324 and display devices 326 are coupled to bus 320. These systems enable users to monitor operations of NS system 302 and software subsystem updates contained in secondary storage 322.

Network System Software Manager

Figure 4:
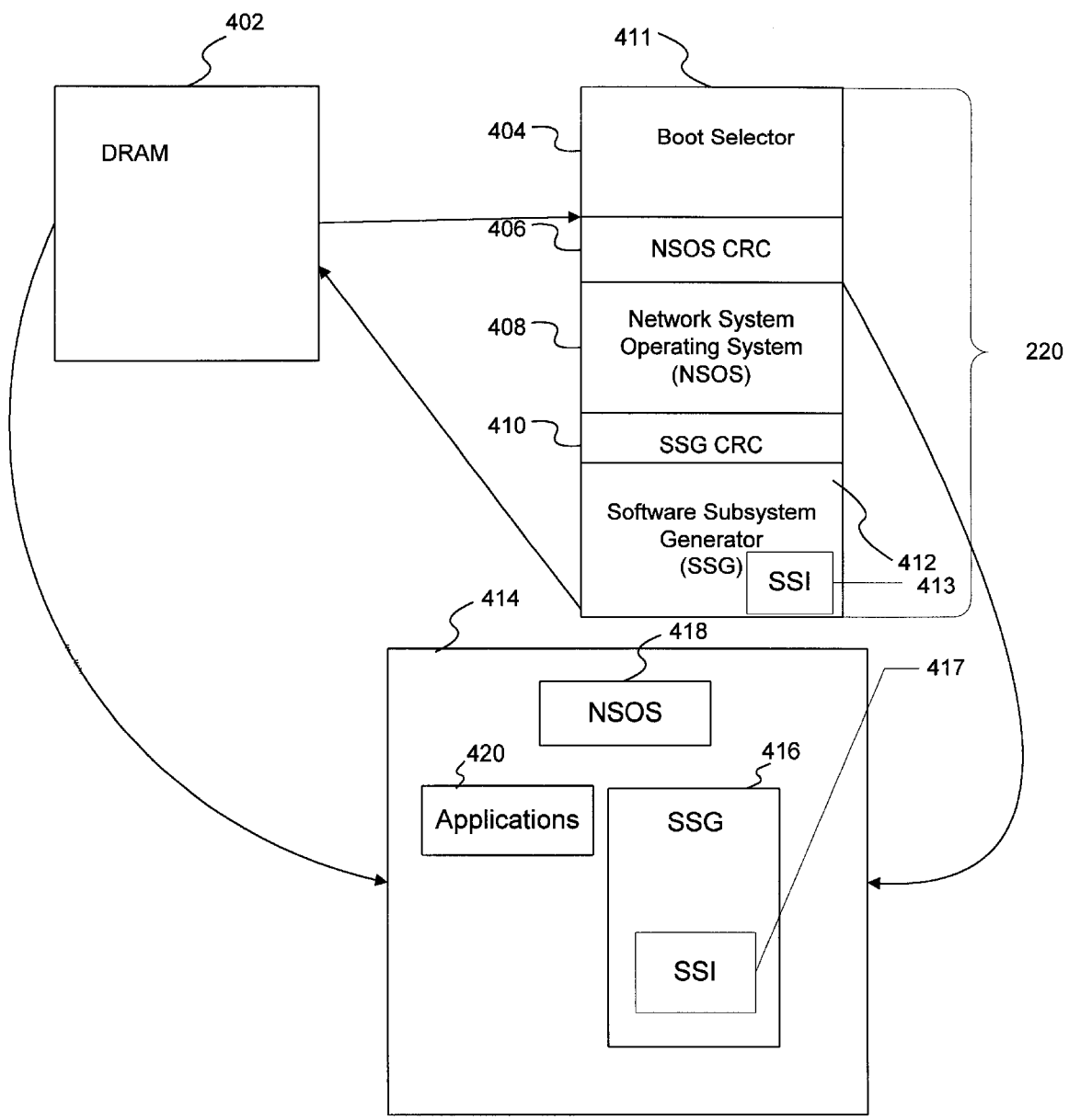
FIG. 4 is a block diagram representation of several storage systems used in conjunction with methods and systems consistent with the present invention.

FIG. 4 is a block diagram representation of several storage systems used with methods and systems consistent with the present invention. The storage subsystems utilized include flash memory 411, dynamic random access memory (DRAM) 402, and a disk storage 414. Disk storage 414 is generally made available to NS device 200 using a remote filesystem method such as NFS or AFS. Alternatively, the disk storage could be a disk drive directly coupled to NS device 200.

NS software manager 220 is particularly useful for updating and correcting critical software subsystems that may cause system failure if they are not kept up to date or become corrupt. In particular, NS software manager 220 is useful in updating flash memory since an incorrect burn of software into flash memory can require a factory replacement of the flash memory. These software subsystems may include boot records, operating systems, applications, communication protocols, and device drivers. Accordingly, FIG. 4 concerns application of NS software manager 220 as it relates to managing a software subsystem used as the operating system of NS device 200. Those skilled in the art will appreciate NS software manager 220 could manage many different types of software subsystems in addition to an operating system.

NS software manager 220 is a combination of several items stored in flash memory 411. NS software manager 220 includes a boot selector 404, a network system operating system cyclic-redundant-check (NSOS CRC) 406, a network system operating system (NSOS) 408, a SSG cyclic-redundant-check (SSG CRC) 410, and a SSG 412. SSG 412 also includes a software subsystem installer 413 (SSI) to install updated versions of SSG 412 into flash.

Boot selector 404 is an application burned in flash, which determines if the NS device can be booted from NSOS 408. To make this determination, boot selector 404 calculates a current NSOS CRC for NSOS 408 and compares it with the original NSOS CRC 406 stored in flash. Depending on the results of the comparison, boot selector 404 can determine whether NSOS 408 has been corrupted or remains a valid executable image. For example, NSOS 408 is considered corrupt if the current NSOS CRC is different from the original NSOS CRC 406 stored in flash.

Similarly, boot selector 404 performs a comparison between the original SSG CRC 410 stored in flash and a current SSG CRC to determine if SSG 412 is corrupt or is a valid executable. If the current SSG CRC value calculated by boot selector 404 matches original SSG CRC 410 value stored in flash, then SSG 412 is suitable for execution.

DRAM 402 is used as temporary storage while a new NSOS 408 or SSG 412 is burned into flash. This accommodates those flash memory devices which can not access flash to execute an application while simultaneously burning an application into another area of the flash. This situation typically arises when SSG 412 is used to burn a new NSOS 408 into flash. To solve this limitation, DRAM 402 is used to temporarily hold SSG 412 while the new operating system is burned into flash. More complex flash memory that can read instructions from one area of flash and burn instructions in another area of flash do not need to use DRAM 402. This latter type of flash memory can also be more expensive. In either case, NS software manager 220 designed in accordance with methods and systems of the present invention can work with both types of flash memory.

Disk storage 414 is used as a repository of the latest updates to the software subsystems used on NS device 200. To reduce the total cost of ownership, disk storage 414 can be located on a central server such as NS server 302. This facilitates centralized management of all the latest updates and versions of the various software subsystem updates. Accordingly, the software subsystems are then delivered by the NS software manager to each NS device 200 utilizing a remote file server protocol such as NFS, AFS, or more a primitive file transfer protocols such as ftp. Alternatively, disk storage 414 can be a local disk drive coupled to the NS device 200 rather than utilizing a centralized distributed file server technology as described above.

The software subsystems stored on disk storage 414 in FIG. 4 can include a variety of applications 420, a NSOS 418, and also a SSG 416. The types of applications included in applications 420 can include any application capable of running on NS device 200. This includes complete applications, such as word processing, or modules in a distributed software subsystems such as software used in a distributed telephony system. Similarly, NSOS 418 can include any operating system or runtime module used on NS device 200. For example, NSOS 418 could be the vxWorks real time operating system. NSOS 418 could also be other real time and non-real time operating systems.

SSG 416 is capable of generating the latest updated software subsystem once they are installed on NS device 200. This meta-software application has the latest version of the software subsystem compressed and embedded within the SSG 416 as data. SSG 416 can also include an updated version of a software subsystem installer (SSI) 417. SSI 413 in flash is replaced with an updated SSI 417 when a new installation protocol or technique is desired or necessary. Installing SSI 417, however, does not interfere with other subsystems such as boot selector 404. This separation keeps boot selector 404 and other subsystems intact when updates fail and reduces the probability that NS device 200 will not boot.

In operation, executing SSG 416 on the NS device 200 causes it to decompress the updated software subsystem and burn it into flash memory. SSI 417 is installed into flash memory along with SSG 416 to assist in updating subsequent versions of software. For example, one such SSG can be used to deliver an updated operating system to NS device 200. An existing SSI 413 is used to transfer the operating system from a remote storage area or disk to NS device 200. The updates in the updated SSG 416 can also include fixes to SSI 413 by installing the new SSI 417 over existing SSI 413.

Figure 5:
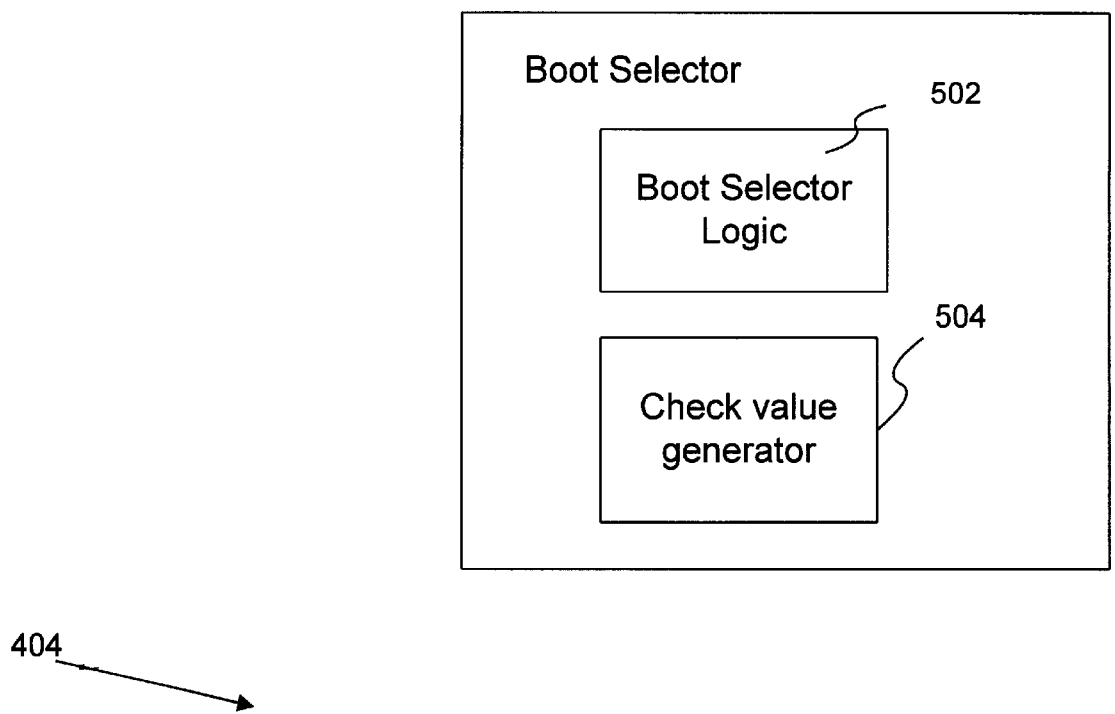
FIG. 5 is a block diagram representation of boot selector logic found in NS software manager in accordance with methods and systems consistent with the present invention.

FIG. 5 is a block diagram representation of boot selector 404 found in NS software manager 220. Boot selector 404 generally includes a boot selector logic 502 and a check value generator 504. Boot selector logic 502 includes logic to compare the check values generated by check value generator 504 with a predetermined check value associated with a software subsystem stored in a storage device 411. Check value generator 504 includes logic capable of generating a predetermined check value from the numeric value representation of a particular software subsystem. For example, check value generator 504 can generate a simple sum of the hex representation of each word in a software subsystem and generate a numeric value representation associated with the particular software subsystem. To insure this value uniquely identifies the software subsystem, check value generator 504 is also capable of generating more sophisticated check values such as a cyclic-redundancy-check.

Figure 6:
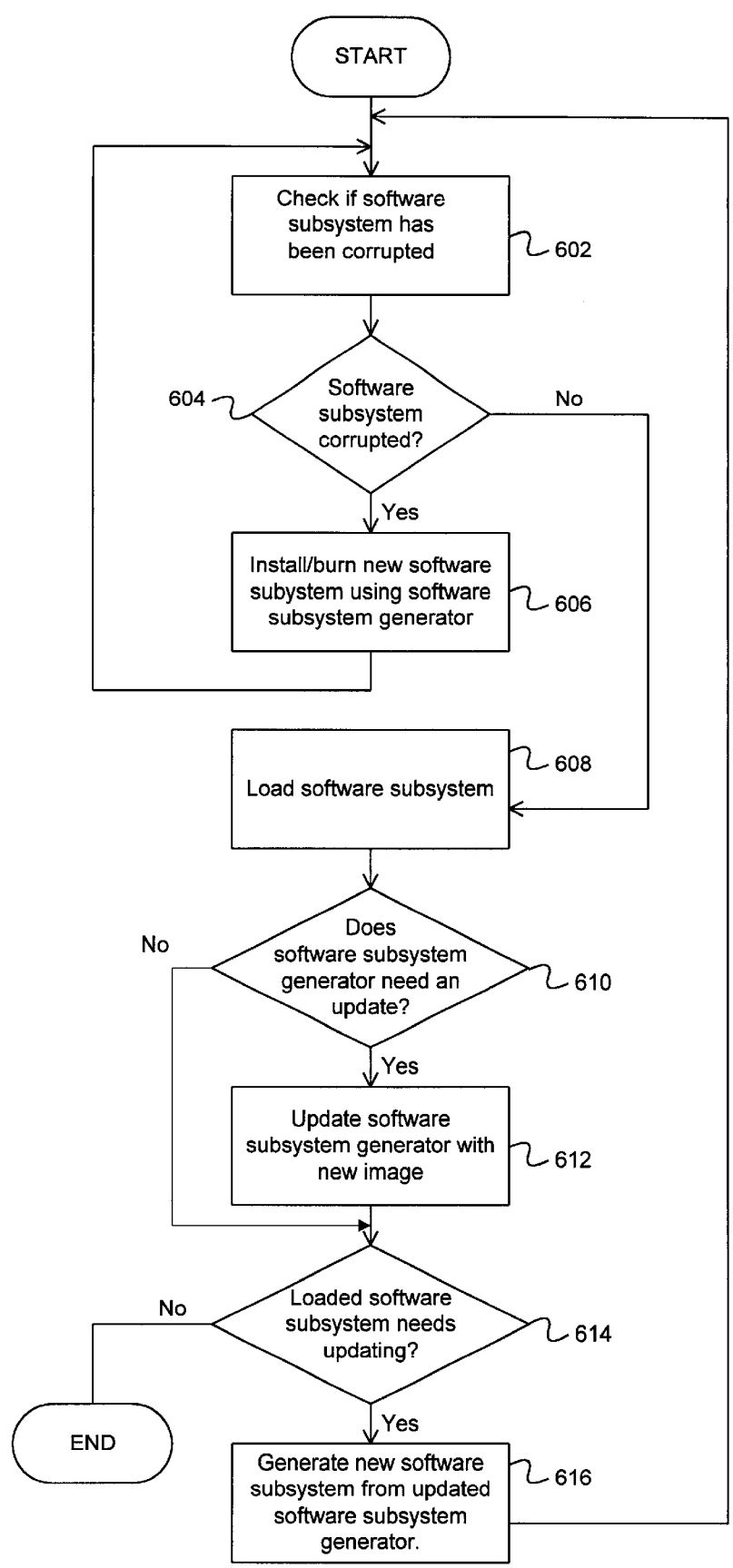
FIG. 6 is a flow chart indicating the steps performed by a NS software manager operating in accordance with methods and systems consistent with the present invention.

FIG. 6 is a flow chart indicating the steps performed by a NS software manager operating in accordance with methods and systems consistent with the present invention. Essentially, NS software manager 220 ensures that a software subsystem on an NS device, is not corrupt and is updated with the latest version. This novel method and system also works when the system is shut off or crashes part way through the installation process. This is particularly important when working with flash memory and other devices that do not work properly after a failed installation.

NS software manager 200 is typically invoked when NS device 200 is initially loaded at boot-up or when a software subsystem must be updated. For example, an initial load occurs when NS device 200 attempts to load a software subsystem from a storage device, such as flash memory, associated with the network system. For example, in FIG. 4 NSOS 408 is the software subsystem loaded at boot-up.

Boot selector logic 502 verifies that the software subsystem has not been corrupted since the software subsystem was originally generated. Initially, boot selector logic 502 uses check value generator logic 504 to generate a current check value, such as a CRC, from a current set of numeric values associated with a software subsystem stored in storage device 411 (step 602).

The original check value, generally a CRC, is also extracted from storage device 411. The original check value is generated from an original set of numeric values associated with the software subsystem when it was originally generated and installed. Boot selector logic 502 compares the current check value with the original check value to determine if the software subsystem was corrupted after the original check value was generated (step 604). If the original check value matches the current check value, the software subsystem has not been corrupted and the software subsystem can be loaded and prepared to begin executing functions associated with the software subsystem (step 608).

Alternatively, when the software subsystem has been corrupted, SSG 412 is used to regenerate the software system. SSG 412 generates a new software subsystem that just like the software subsystem that was in existence before the software subsystem was corrupted. For example, SSG 412 in FIG. 4 generates a new NSOS 408 if the original NSOS 408 has been corrupted. The new software subsystem NSOS 408 is used to replace the corrupted software subsystem (step 606).

Boot selector logic 502 also determines if SSG 412 is the most recent version and has not been corrupted since it was created (step 610). If a more recent version of SSG 412 exists or SSG 412 has been corrupted then boot selector logic 502 uses a transfer protocol provided by SSI 413 to replace the existing older versions of SSG 412 with the new image of SSG 416 stored on the network server. In one embodiment, data transfer facilities built into SSI 413 copies SSG 416 from disk storage 414 and burns the application in flash memory and replaces SSG 412 (step 612). If disk storage 414 is associated with server 302, SSI 413 can use a file transfer protocol such as ftp or can utilize a remote file server protocol such as NFS, AFS, or any other similar remote file sharing technique. Boot selector logic 502 then determines if the software subsystem needs updating. If the software subsystem is already updated then NS software manager 200 is complete. However, if the software subsystem is not updated then a new software subsystem is generated from SSG 412 (step 616) and installed in the NS device 200 by performing another iteration of steps 602–614 discussed above.

This update technique is powerful because it can install an update without risking system downtime. Critical software subsystems are not replaced unless they can be quickly recreated using a software subsystem generator such as SSG 412. When the a software subsystem needs an update, NS software manager 220 uses SSG 412 to facilitate upgrading the software subsystem to a new version. For example, assume SSG 412 can generate version 4.0 of a network system operating system (NSOS) and NSOS 408 loaded in flash is the older version 3.3. NS software manager 220 causes SSG 412 to generate version 4.0 of NSOS and burn the new version of the NSOS into flash 411 over the existing NSOS 408. If the process fails, NS software manager 220 will repeat the process until the update is successful.

Similarly, communication protocols are not changed between a client and server until the new communication protocols are successfully installed on the client, such as SSI 413. For example, assume subsystem installer 417 is initially a primitive file transfer protocol such as ftp. Using NS software manager 220, subsystem installer 417 can be updated to use an upgraded ftp software subsystem or a more sophisticated subsystem such as NFS. This ensures that flash memory in NS device 200 does not have to be replaced even when new file transfer protocols are utilized.

While specific embodiments have been described herein for purposes of illustration, various modifications may be made without departing from the spirit and scope of the invention. A method and system substantially similar to NS software manager 220 can be generated except that the software subsystem installer is part of the boot selector subsystem rather than the software subsystem generator. In this embodiment, the software subsystem installer would occupy a portion of the boot selector subsystem and replacing or updating the software subsystem installer may modify one or more portions of code associated with the boot selector subsystem. Accordingly, the invention is not limited to the above described embodiments, but instead is defined by the appended claims in light of their full scope of equivalents.

What is claimed is:

1. A method for verifying a software subsystem stored on a network system (NS) device coupled to a server computer over a network, the method comprising the steps of:

initiating a load of the software subsystem from a storage device associated with the NS device;

invoking, in response to initiating a load of the software subsystem, a software manager that verifies the software subsystem;

verifying whether the software subsystem has been altered since the software subsystem was originally stored on the NS device using the software manager; and regenerating the software subsystem on the NS device using a software subsystem generator (SSG) if the software subsystem has been altered, and if the software subsystem has not been altered, continuing the load of the software subsystem.

2. The method of claim 1 wherein the network system includes a storage device, a display device, an input/output mechanism, and a network connection device for coupling the network system to the server computer over the network.

3. The method of claim 1 wherein the initiating step includes the substep initiating a load of an operating system.

4. The method of claim 1 wherein the initiating step includes the substep initiating a load of a software application.

5. The method of claim 1 wherein the storage device is a flash memory.

6. The method of claim 1 wherein the verification step further includes the substeps of:

generating a current check value from a set of numeric values associated with the software subsystem;

extracting an original check value generated from an original set of numeric values associated with the software subsystem when it was originally stored on the network system; and comparing the current check value with the original check value to determine if the software subsystem was altered after the original check value was generated.

7. The method of claim 6 wherein the generating step includes the substep of generating the current check value utilizing a cyclic-redundancy check (CRC) technique.

8. The method of claim 6 wherein the extracting step includes the substep of extracting the original check value generated using a cyclic-redundancy check (CRC) technique.

9. The method of claim 1 wherein the regenerating step further includes the substeps of:

generating a new software subsystem to replace the altered software subsystem, wherein the new software subsystem is the software subsystem before it was altered; and replacing the altered software subsystem with the new software subsystem.

10. The method of claim 1 further including the step of updating the software subsystem with the most recent version of the software subsystem, wherein the updating step further includes the steps of:

determining if the SSG on the network systems is the most recent version and has not been altered since it was created;

updating the SSG stored on the network system with the most recent version of the SSG when the SSG on the network systems has been altered or a more recent version of the SSG exists;

determining if the software subsystem loaded on the network system is the most recent version of the software subsystem compared with the software subsystem version the SSG is capable of generating; and updating the software subsystem with the most recent version using the updated SSG when the software subsystem is not the most recent version of the software subsystem.

11. The method of claim 10 wherein the updating step further includes the substeps of:

obtaining the updated version of the SSG from the server; and replacing the SSG on the network system with the updated version of the SSG.

12. A method for updating a software subsystem on a network system (NS) device, wherein the updated software subsystem is stored on a server computer coupled to the NS device over a network, including the steps of:

invoking a software manager on the NS device;

determining if a SSG on the network system is the most recent version and has not been altered since it was created using the software manager;

updating the SSG stored on the network system with the most recent version when a more recent version of the SSG exists or the SSG has been altered;

determining if the software subsystem on the network system is the most recent version of the software subsystem compared with the software subsystem version the updated SSG is capable of generating; and loading the software subsystem when the software subsystem is the most recent version, and if the software subsystem is not the most recent version of the software subsystem, updating the software subsystem using the SSG.

13. The method in claims 12 wherein the updating step further includes the substeps of:

obtaining the most recent version of the SSG from the server; and replacing the SSG on the network system with the most recent version of the SSG.

14. An apparatus for verifying a software subsystem stored on a network system (NS) device which is coupled to a server computer over a network comprising:

an initiating module configured to initiate a load of the software subsystem from a storage device associated with the network system;

an invoking module configured to invoke a software manager that verifies the software subsystem in response to initiating a load of the software subsystem;

a verifying module configured to verify the software subsystem has not been altered since the software subsystem was originally stored on the network system using the software manager; and a regenerating module configured to regenerate the software subsystem on the NS device using a SSG when the software subsystem has been altered, and if the software subsystem has not been altered, continuing the load of the software subsystem.

15. The apparatus of claim 14 wherein the network system includes a storage device, a display device, an input/output mechanism, and a network device for coupling the network system to the server computer over the network.

16. The apparatus of claim 14 wherein the software subsystem is an operating system.

17. The apparatus of claim 14 wherein the software subsystem is a software application.

18. The apparatus of claim 14 wherein the storage device is flash memory.

19. The apparatus of claim 14 wherein the verifying module further comprises:

a generating module configured to generate a current check value from a set of numeric values associated with the software subsystem;

an extracting module configured to extract an original check value which was generated from an original set of numeric values associated with the software subsystem when it was originally stored on the network system; and a comparing module configured to compare the current check value with the original check value to determine if the software subsystem was altered after the original check value was generated.

20. An apparatus for updating a software subsystem performed on a network system (NS) device wherein the updated software subsystem is stored on a server computer coupled to the NS device over a network, comprising:

an invoking module configured to invoke a software manager on the NS device;

a determining module configured to determine if a software subsystem generator (SSG) on the NS device is the most recent version and has not been altered since it was created using the software manager;

an updating module configured to update the SSG stored on the network system with the most recent version when a more recent version of the SSG exists or the SSG has been altered;

a determining module configured to determine if the software subsystem on the network system is the most recent version of the software subsystem compared with the software subsystem version the updated SSG is capable of generating; and, an updating module configured to load the software subsystem when the software subsystem is the most recent version, and if the software subsystem is not the most recent version of the software subsystem, configured to update the software subsystem using the SSG.

21. The apparatus in claim 20 wherein the updating module configured to update the SSG further includes:

an obtaining module configured to obtain the most recent version of the SSG from the server; and a replacing module configured to replace the SSG on the network system with the most recent version of the SSG.

22. A computer program product capable of configuring a data processor to verify a software subsystem stored on a network system (NS) device coupled to a server computer over a network, the computer program product comprising program code to cause the data processor to perform the steps of:

initiating a load of the software subsystem from a storage device associated with the network system;

invoking a software manager that verifies the software subsystem in response to initiating a load of the software subsystem;

verifying the software subsystem has been altered since the software subsystem was originally stored on the network system using the software manager; and regenerating the software subsystem using a software subsystem generator on the NS device if when the software subsystem has been altered, and if the software subsystem has not been altered, continuing the load of the software subsystem.

23. The computer program product of claim 22 wherein the code includes the substep of initiating the loading of an operating system.

24. The computer program product of claim 22 wherein the verifying step further includes the steps of:

generating a current check value from a set of numeric values associated with the software subsystem;

extracting an original check value which was generated from an original set of numeric values associated with the software subsystem when it was originally stored on the network system; and comparing the current check value with the original check value to determine if the software subsystem was corrupted after the original check value was generated.

25. The computer program product of claim 22 wherein the regenerating step further includes:

generating a new software subsystem to replace the software subsystem that was in existence before the software subsystem was altered; and replacing the altered software subsystem with the new software subsystem.

26. The computer program product of claim 25 wherein the step of updating the SSG further includes the substeps of:

obtaining the updated version of the SSG from the server; and replacing the SSG on the NS device with the updated version of the SSG.

27. The computer program product of claim 22 further including the step of updating the software subsystem with the most recent version of the software subsystem, wherein the updating step includes the substeps of:

determining if the software subsystem generator (SSG) on the network systems is the most recent version and has not been altered since it was created;

updating the SSG stored on the network system with the more recent version of the SSG when the SSG on the network systems has been altered or a more recent version of the SSG exists;

determining if the software subsystem loaded on the network system is the most recent version of the software subsystem compared with the software subsystem version the updated SSG is capable of generating; and updating the software subsystem with the most recent version using the updated SSG when the software subsystem is not the most recent version of the software subsystem.

* * * * *

UNITED STATES PATENT AND TRADEMARK OFFICE
CERTIFICATE OF CORRECTION

PATENT NO. : 6,330,715 B1
DATED : December 11, 2001
INVENTOR(S) : Siamak Razzaghe-Ashrafi It is certified that error appears in the above-identified patent and that said Letters Patent is hereby corrected as shown below:

Column 12,
Line 50, change "claims 12" to -- claim 12 --.

Column 14,
Line 9, change "has been" to -- has not been --.
Line 50, change "network systems" to -- network system --.
Line 54, change "network systems" to -- network system --.

Signed and Sealed this

Eighth Day of October, 2002

Attest:

Attesting Officer

JAMES E. ROGAN
Director of the United States Patent and Trademark Office